United States Patent [19]

Kaye et al.

[11] Patent Number: 5,089,882
[45] Date of Patent: Feb. 18, 1992

[54] PROCESSOR FOR COLOR VIDEO SIGNALS

[75] Inventors: Michael C. Kaye, Agoura Hills; Majid Bemanian, Glendale, both of Calif.

[73] Assignee: MSCL, Inc., Hollywood, Calif.

[21] Appl. No.: 404,856

[22] Filed: Sep. 8, 1989

[51] Int. Cl.⁵ .............................................. H04N 9/64
[52] U.S. Cl. ...................................................... 358/28
[58] Field of Search ...................................... 358/22, 28

[56] References Cited

U.S. PATENT DOCUMENTS

| | | | |
|---|---|---|---|
| 4,384,302 | 5/1983 | Schwarz | 358/27 |
| 4,500,919 | 2/1985 | Schreiber | 358/78 |
| 4,525,736 | 6/1985 | Korman | 358/27 |
| 4,553,157 | 11/1985 | Hurst et al. | 358/27 |
| 4,782,384 | 11/1988 | Tucker et al. | 358/27 |

FOREIGN PATENT DOCUMENTS 930749  5/1982  U.S.S.R. ................................ 358/22

OTHER PUBLICATIONS

Kadenza Installation Manual, pp. 5-27.
VPA-330N NTSC Video Processing Amplifier, Instruction Manual, Leitch Video of America, Inc., p. 2 of Section 330PI.04.84 and p. 2 of Section 330PO.04.84.

Primary Examiner—John W. Shepperd
Attorney, Agent, or Firm—Pretty, Schroeder, Brueggemann & Clark

[57] ABSTRACT

A processor includes an input for receiving video color component signals, and a circuit for deriving a luminance signal and a color magnitude signal from the video color component signals. A further circuit is provided for modifying at least one of the luminance and color magnitude signals whenever a composite video signal derived from the luminance signal in the color magnitude signal has a magnitude which exceeds a predetermined value. An output is provided for producing color component signals derived from the luminance and color magnitude signals from the modifying circuit.

24 Claims, 4 Drawing Sheets

| VALUE | REGISTER NO. | | | | | | | | | | |
|---|---|---|---|---|---|---|---|---|---|---|---|
| | 0-16 | 17 | 18 | 19 | --- | 235 | 236 | 237 | 238 | --- | 254 | 255 |
| | 16 | 17 | 18 | 19 | --- | 235 | 236 | 236 | 236 | --- | 236 | 236 |

LUMINANCE CLIP LOOKUP TABLE (44)

FIG. 3

| VALUE | REGISTER NO. | | | | | | | | | | |
|---|---|---|---|---|---|---|---|---|---|---|---|
| | 0-16 | 17 | 18 | 19 | --- | 235 | 236 | 237 | 238 | --- | 254 | 255 |
| | 16 | 17 | 18 | 19 | --- | 235 | 236 | 236 | 236 | --- | 236 | 236 |

LUMINANCE (ISO) CLIP LOOKUP TABLE (50)

FIG. 4

SATURATION CLIP LOOKUP TABLE (58)

| S A T U R A T I O N (M) | 16 | 17 | 18 | ... | 109 | 110 | 111 | 112 | 113 | 114 | 115 | 116 | 117 | 118 | 119 | 120 | 121 | 122 | 123 | 124 | 125 | 126 | 127 | 128 | 129 | ... | 230 | 231 | 232 | 233 | 234 | 235 |
|---|---|---|---|---|---|---|---|---|---|---|---|---|---|---|---|---|---|---|---|---|---|---|---|---|---|---|---|---|---|---|---|---|
| 127 | 26 | 27 | 28 | | | | | | | | | | | | 119 | 120 | 121 | 122 | 123 | | | | | | | | | | | | | 1 |
| 126 | 26 | 27 | 28 | | | | | | | | | | | | 119 | 120 | 121 | 122 | 123 | | | | | | | | | | | | 2 | 1 |
| 125 | 26 | 27 | 28 | | | | | | | | | | | | 119 | 120 | 121 | 122 | 123 | | | | | | | | | | | 3 | 2 | 1 |
| 124 | 26 | 27 | 28 | | | | | | | | | | | | 119 | 120 | 121 | 122 | 123 | | | | | | | | | | 4 | 3 | 2 | 1 |
| 123 | 26 | 27 | 28 | | | | | | | | | | | | 119 | 120 | 121 | 122 | 123 | | | | | | | | | 5 | 4 | 3 | 2 | 1 |
| 122 | 26 | 27 | 28 | | | | | | | | | | | | 119 | 120 | 121 | 122 | 123 | | | | | | | | 6 | 5 | 4 | 3 | 2 | 1 |
| 121 | 26 | 27 | 28 | | | | | | | | | | | | 119 | 120 | 121 | 122 | | | | | | | | | 6 | 5 | 4 | 3 | 2 | 1 |
| 120 | 26 | 27 | 28 | | | | | | | | | | | | 119 | 120 | 121 | | | | | | | | | | | | | | | |
| 119 | 26 | 27 | 28 | | | | | | | | | | | | 119 | | | | | | | | | | | | | | | | | |
| 118 | 26 | 27 | 28 | | | | | | | | | | | | 118 | 118 | | | | | | | | | | | | | | | | |
| 117 | 26 | 27 | 28 | | | | | | | | | | | | 117 | 117 | 117 | | | | | | | | | | | | | | | |
| ... | | | | | | | | | | | | | | | | | | | | | | | | | | | | | | | | |
| 28 | 26 | 27 | 28 | | | | | | | | | | | | | | | | | | | | | | | | | | | | | |
| 27 | 26 | 27 | 27 | | | | | | | | | | | | | | | | | | | | | | | | | | | | | |
| 26 | 26 | 26 | 26 | | | | | | | | | | | | | | | | | | | | | | | | | | | | | |
| 25 | 25 | 25 | 25 | | | | | | | | | | | | | | | | | | | | | | | | | | | | | |
| 24 | 24 | 24 | 24 | | | | | | | | | | | | | | | | | | | | | | | | | | | | | |
| ... | | | | | | | | | | | | | | | | | | | | | | | | | | | | | | | | |
| 3 | 3 | 3 | 3 | | | | | | | | | | | | | | | | | | | | | | | | 3 | 3 | 3 | 3 | 3 | |
| 2 | 2 | 2 | 2 | | | | | | | | | | | | | | | | | | | | | | | | 2 | 2 | 2 | 2 | 2 | |
| 1 | 1 | 1 | 1 | | | | | | | | | | | | | | | | | | | | | | | | 1 | 1 | 1 | 1 | 1 | |
| 0 (M) | 0 | 0 | 0 | | | | | | | | | | | | | | | | | | | | | | | | 0 | 0 | 0 | 0 | 0 | 0 |

LUMINANCE (Y')

PROCESSOR FOR COLOR VIDEO SIGNALS

BACKGROUND OF THE INVENTION

1. Field of the Invention

The present invention relates to processors for color video signals, and more specifically to such processors which limit the amplitude of a composite color video signal by limiting the amplitude of color component signals.

2. Related Art

In analog color video signal processing, input red, green and blue color signals (RGB) may be matrixed to color signals and luminance (Y) signals, where the color signals may be in the form of color difference signals, such as R-Y and B-Y. The color difference signals contain the hue and saturation information from the original color video. Luminance, hue and saturation may be processed or corrected using color correction processors, and the luminance, R-Y and B-Y signals rematrixed to RGB, which may then be combined into an encoded NTSC or PAL composite color video signal. While the input color video signal prior to processing typically may not include color signals whose amplitudes are outside predefined limits such as industry standards or regulatory limits set by the Federal Communications Commission (FCC), the signal processing of the luminance, R-Y and B-Y signals may result in an output composite color video signal having amplitudes outside FCC limits or other predefined limits. To eliminate the possibility of such high amplitudes, an analog processing amplifier clips the appropriate signals in the composite video at the desired levels so as not to exceed FCC limits. One such processing amplifier is marketed by Leitch Video of America, Model No. VPA-330N.

With the advent of digital video processing, digital composite color video signals, called D2, can be processed digitally, as can the digital component signals for luminance, R-Y and B-Y, called D1. However, there is no device to limit the amplitudes of the data in the D1 or D2 formats except as may be inherent in the signals being limited to 8 bits of data. 8 bits allows 256 different incremental values from a minimum value at 0 to a maximum value at 255. However, because the industry has selected the maximum pre-defined value to occur at the 236th incremental value and the minimum predefined value to occur at 16, there are at least sixteen possible incremental values the digital signals can take above and below the pre-defined limits. If the signals exceed those limits, the resulting composite video formed from the component signals may exceed the pre-defined limits.

There is a need for a processor for insuring that the D1 signals (digital luminance, R-Y and B-Y) are limited so as to keep the resulting encoded NTSC or PAL composite signals within the pre-defined limits. This should be done in such a way that the composite signal is maintained within the pre-defined limits while still insuring that any processing of the color video signals is carried through with a minimum of change to the luminance, hue or saturation of the resulting composite signal.

SUMMARY OF THE INVENTION

A processor is disclosed which insures that color component signals are limited in such a manner that any resulting composite color video signal remains within predefined amplitude limits. In accordance with the invention, the processor includes means for receiving video color component signals at an input, and means for deriving a luminance signal and a color magnitude signal from the video color component signals. Means are provided for modifying at least one of the luminance and color magnitude signals whenever a composite video signal derived from the luminance signal and the color magnitude signal has a magnitude which exceeds a predetermined value. Means are also provided for producing at an output color component signals derived from the luminance and color magnitude signals from the modifying means.

In a preferred form of the invention, incoming digital component signals are processed to produce a modified luminance signal when the magnitude of the luminance signal exceeds a pre-determined limit. Thereafter, a saturation magnitude signal is processed and modified when the sum of the modified luminance signal and the saturation magnitude signal exceeds a pre-determined limit. The luminance signal and the saturation magnitude signal, whether modified or unmodified, are then reconverted to video color component signals for output. Where the luminance and/or saturation magnitude signals are unmodified, because their combination does not exceed a pre-determined magnitude, the outgoing digital video signals are the same as the incoming digital signal from which they were derived.

With the processor, no D1 video signals are output which, when converted to D2 composite video, produce signals which exceed predefined limits.

DETAILED DESCRIPTION OF THE PREFERRED EMBODIMENT

Figure 1:
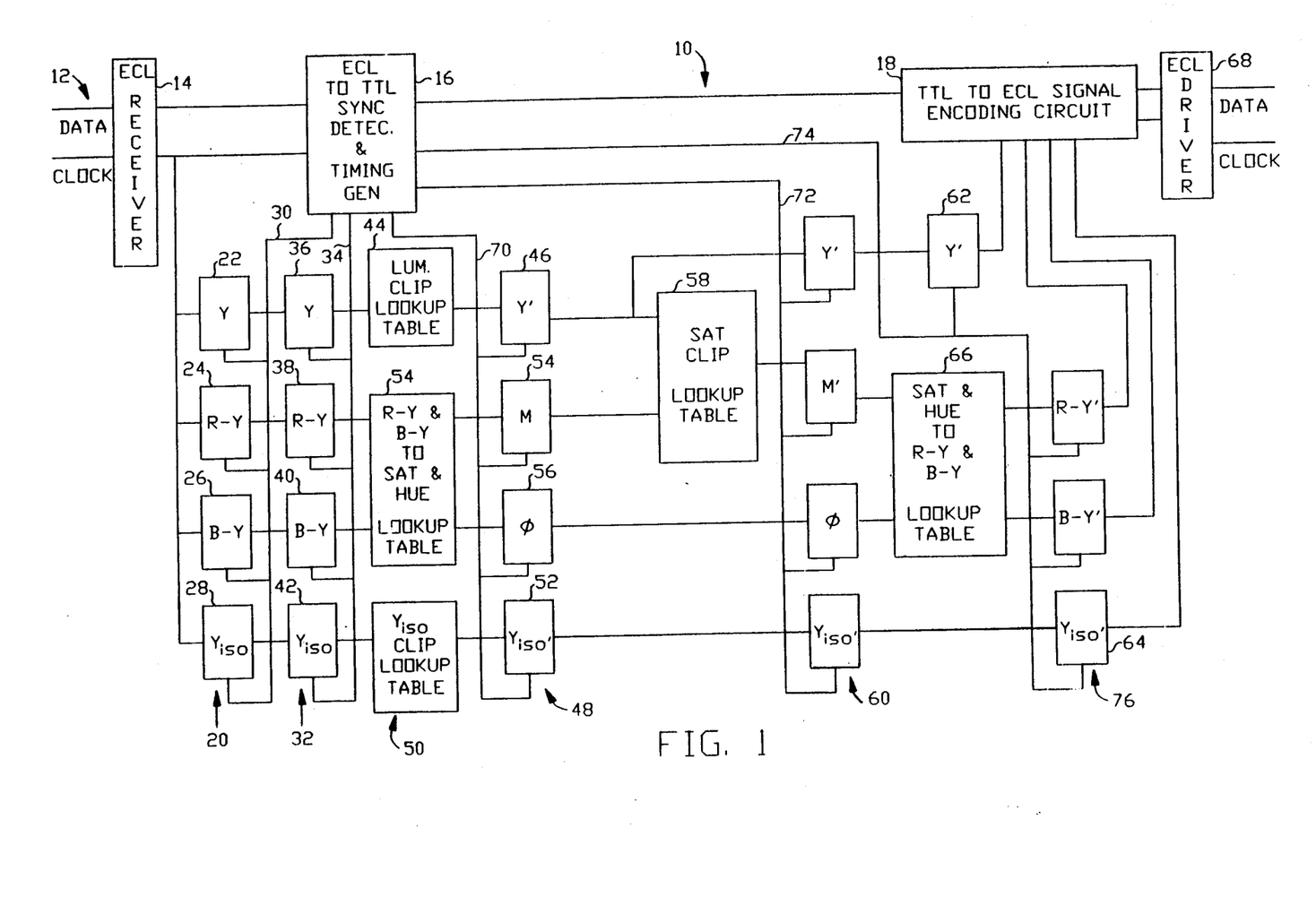
FIG. 1 is a schematic block diagram showing a digital processor for color video signals according to the present invention.

In accordance with the present invention, a processor for color video signals such as a digital processor receives color component video signals from a color corrector or other device and insures that the signals are limited so as to keep the resulting encoded composite color video signals within predefined limits. The digital processor 10 in the disclosed embodiment receives at an input 12 digital color video signals. The signals may have been color corrected, for example, using an appropriate color correction device well known in the art. The color correction device may have adjusted the hue, saturation, luminance or other color characteristic of the incoming color video signals. In a preferred embodiment, the processor is placed at the output of the color corrector before the monitor so that the colorist can see on the monitor how the processor has limited, if at all, the color corrections attempted to be made by the colorist. Alternatively, the signals may be output from any other device which produces color component signals for storage, processing or the like. However, the digital signals will not have been analyzed to determine whether or not they are within acceptable predetermined limits, such as those defined by industry standards or by regulatory limits set by the Federal Communications Commission. The input digital signals may include color difference signals such as R-Y and B-Y color difference signals or I and Q color difference signals, along with a digital representation of a luminance signal.

The processor in effect predicts what the modulated chrominance amplitudes would be when the color component video signals are modulated into a composite video signal and limits the amplitudes of the modulated chrominance signals so that they do not extend beyond predefined limits by limiting the amplitudes of the color component video signals. In the preferred embodiment, the unanalyzed digital color signals are applied in serial fashion along an 8-bit differential data line to an ECL receiver 14, well known in the art. A 1-bit differential clock signal is also applied to the receiver 14 for providing synchronization in the digital processor circuit. The incoming digital data signal may be a signal which is commonly termed "D1" corresponding to 4:2:2 digital data commonly used in color video processors. Such signals are typically 8-bit digital signals, but they may also be 10-bit digital signals or signals having some other format. The clock signal is applied to an ECL-to-TTL synchronization detector and timing generator 16. The timing generator controls each of five series of latches as will be apparent in the discussion to follow. The synchronization detector and timing generator 16 also controls a TTL-to-ECL signal encoding circuit 18, to be described more fully below.

The incoming digital data is applied to a first bank of latches for accepting the digital data according to the proper sequence. The first bank of latches 20 effectively translates under control of the timing generator 16 the serial data to parallel data so that the luminance, color difference and luminance(iso) signals can be derived separately from the incoming digital signals and processed in parallel. Processing in this manner ensures that the signals corresponding to a given pixel in the scene are processed together. A first luminance latch 22 accepts an 8-bit digital signal representing luminance in the incoming digital data signal. A first R-Y latch 24 accepts an 8-bit digital data signal representing the color difference signal R-Y. A first B-Y latch 26 accepts an 8-bit digital signal from the incoming data stream representing the color difference signal B-Y. A first luminance(iso) (Yiso) latch 28 accepts an 8-bit digital data signal from the incoming data stream representing the luminance(iso) signal. The data is latched in the appropriate latches in the first bank of latches according to a timing signal output by the timing generator 16 on a first timing circuit 30. The first timing circuit 30 applies a 4-bit signal to the first bank of latches, to cause each respective latch to latch in the proper order for latching the appropriate 8-bit signal. The proper order is B-Y, Y, R-Y, and finally Y(iso), according to convention. This occurs in a first 27 MHz cycle.

In the first of four subsequent 6.75 MHz cycles, the data latched in the first bank of latches 20 is then latched in respective latches in a second bank of latches 32 so that the 4 digital signals, namely luminance, R-Y, B-Y and luminance(iso) can be subsequently processed together. The second bank of latches 32 is controlled by a second 1-bit timing circuit 34 applied to the second luminance latch 36, the second R-Y latch 38, the second B-Y latch 40 and the second luminance(iso) latch 42.

Figure 5:
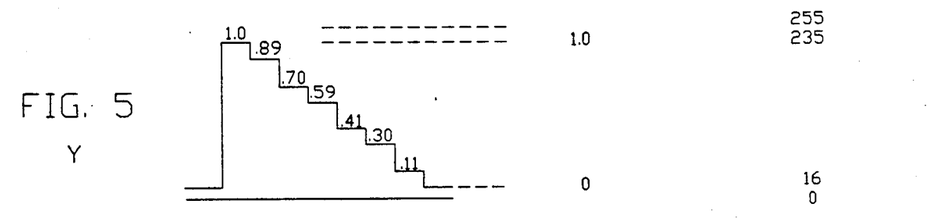
FIG. 5 is schematic diagram representing analog luminance signals.
Figure 6:
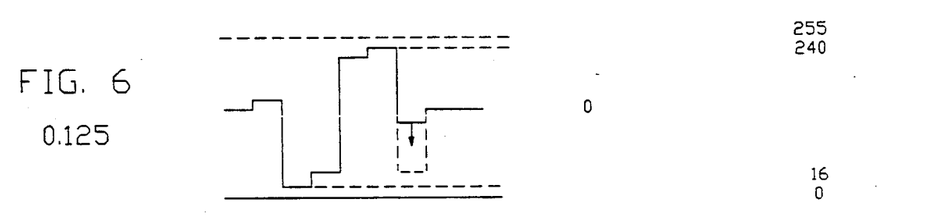
FIG. 6 is a schematic diagram representing analog red color difference signals (R-Y).

In the second 6.75 MHz cycle, the luminance and luminance(iso) digital signals are analyzed to determine whether or not they exceed the predetermined maximum values for the respective signals. The luminance values are compared to respective maximum limits and modified to be equal to the maximum values if they exceed the maximum. Otherwise, they are kept equal to their initial values. In an 8-bit digital signal for luminance, the minimum value corresponds to 0 (zero) and the maximum value corresponds to 255. The analog value of 0 (zero) luminance has been taken to be represented by sixteen while the maximum analog luminance value corresponding to 1.0 is 236. As can be seen in FIG. 5, the incoming luminance signal, which may have been corrected in an appropriate color correction device, may exceed the allowable predetermined values below 0 (zero) or above 1.0. For example, the corrected luminance may have a digital value between 236 and 255. In such a case, a resulting composite color video signal could contain components outside the pre-determined values.

In order to determine the value of the incoming luminance signal, the digital representation of the luminance signal is tested to see if it exceeds 236 (or any other selected value). If the luminance value exceeds 236, a modified luminance value Y' is output having a value of 236. If the incoming luminance value is 236 or less, the "modified" luminance value Y' is made equal to the incoming luminance value.

Figure 2:
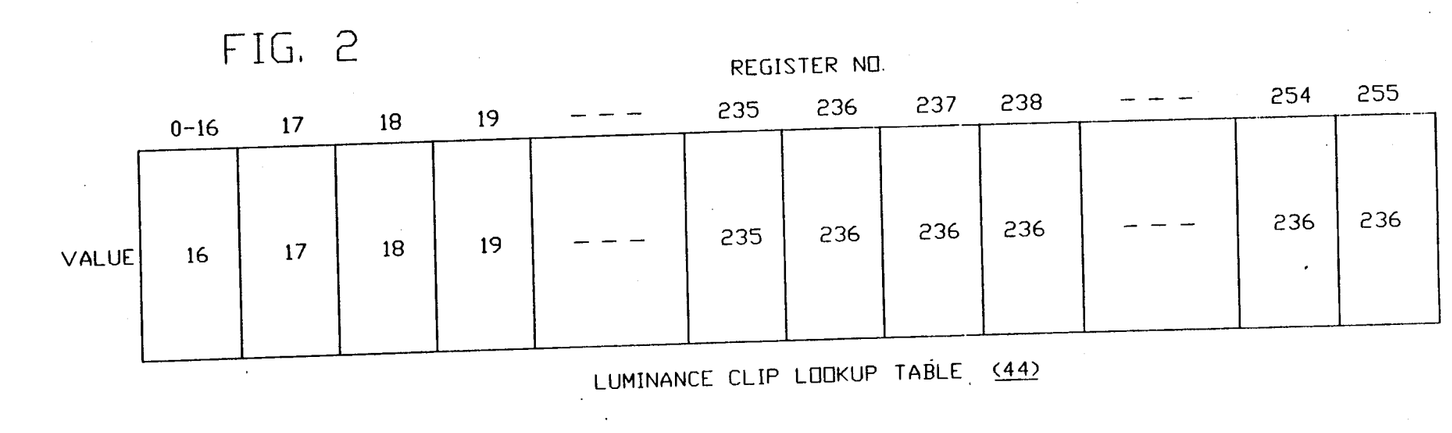
FIG. 2 is a schematic block diagram of a luminance clip lookup table used in the processor of FIG. 1.

Analysis of the luminance signal in the preferred embodiment is carried out digitally using aluminace clipping circuit in the form of a luminance clip lookup table 44 shown schematically in FIG. 2. The luminance clip lookup table is a schematic representation of a 1×8-bit EPROM. The address of each register location corresponds to the digital value of the incoming luminance signal while the contents of each register location corresponds to the value of the "modified" luminance signal. In other words, each incoming luminance signal is replaced by a new value from the contents of the appropriate register. Where the value of the incoming luminance signal is less than the maximum, the "modified" value is equal to the incoming value, i.e. unchanged. Where the incoming value is greater than the maximum, the "modified" value equals the maximum. The term "modified" is used here to designate a parameter that has been evaluated in the lookup table and a new value output therefrom even though the magnitude may remain unchanged. As is well known in the art, the EPROM is programmable so that it can contain the desired values. However, the data contained in the EPROM can be modified as desired in a manner well known to those skilled in the art, to contain an alternative set of data providing any appropriate predetermined range of amplitudes. For example, the maximum may be set at a value other than 236. In the embodiment of the luminance clip lookup table shown in FIG. 2, the values of luminance can extend below 0 (zero) (16 as shown in FIG. 5) since the modified value of the luminance can be as low as 0 (zero). As shown in FIG. 2, the modified luminance values can range from 16 to 236, out of a possible range of 0 (zero) to 255. For greater flexibility for the user, multiple lookup tables may be provided having different sets of data, so that the user may select between them. The modified luminance value is then latched in a third luminance latch 46 in a third bank of latches 48.

Figure 3:
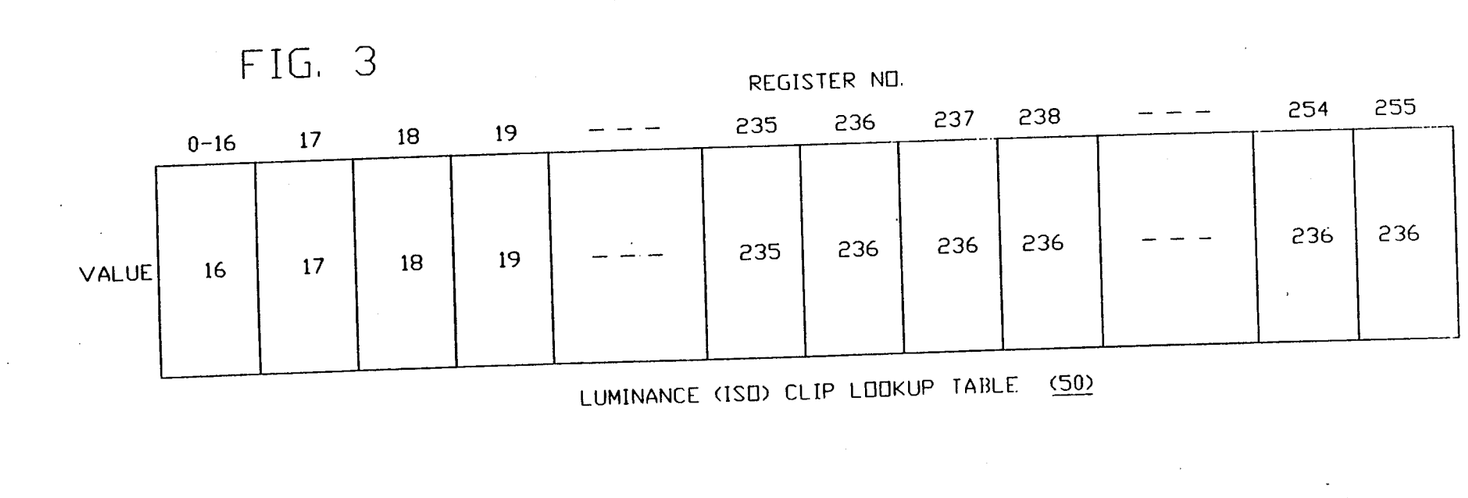
FIG. 3 is a schematic block diagram of a luminance(iso) clip lookup table for use in the digital processor of FIG. 1.

In a manner substantially similar to that described above with respect to the luminance clip lookup table, the luminance(iso) signal is applied to a luminance(iso) ($Y_{iso}$) clip lookup table 50 for analyzing the value of signal $Y_{iso}$ to see if it exceeds the accepted boundaries for the parameter and to output a modified $Y_{iso}'$ signal. Considering FIG. 3, which is a schematic representation of a 1×8 EPROM register constituting the luminance(iso) clip lookup table, each register location corresponds to one of the 256 possible values of luminance(iso). Each register is addressed by a respective digital value of $Y_{iso}$ so that the contents of the respective register can be output to a third $Y_{iso}'$ latch 52 in the third bank of latches. In this manner, the $Y_{iso}$ parameter can be analyzed and modified as appropriate so that it falls within its pre-determined values. In the example shown in FIG. 3, the maximum value corresponds to 236 and the minimum value corresponds to 16. The possible values of $Y_{iso}'$ can be modified as desired by changing the contents of the registers in the EPROM.

In addition to the luminance signals, the digital signals are processed to obtain a color magnitude signal whose magnitude is preferably independent of hue which is then analyzed and modified if necessary to ensure that any composite video signals derived therefrom fall entirely within predetermined boundaries. In the preferred embodiment, the color magnitude signal is a saturation magnitude signal (M). Specifically, the color difference signals R-Y and B-Y are converted to a pair of signals corresponding to hue and saturation prior to being analyzed to see if the signals exceed pre-determined limits. The signals are converted before being analyzed so that the comparison of the incoming digital signals with reference values can be carried out independently of the phase differential in the color difference signals. It is believed that merely modifying or clipping the original color difference signals would be insufficient since the magnitude of each color difference signal is dependent on the hue, so that clipping at a given level may be sufficient at one hue while clipping at the same level for a different hue may not produce a composite signal within proper boundaries. In the preferred embodiment, the digital video color difference signals R-Y and B-Y are converted to equivalent values of saturation and hue in an "R-Y and B-Y"-to-"saturation and hue" lookup table 54. The saturation and hue lookup table 54 preferably consists of a 64 k×16 EPROM whose contents are addressed by unique pairs of values corresponding to the incoming R-Y and B-Y signals. The digital value of the R-Y signal will address one row of the array while the digital value of the B-Y signal will address one column of the array, together defining a unique register. The contents of the uniquely identified register will contain an 8-bit representation of the magnitude of the saturation of the incoming color difference signals and a second 8-bit value representing the angle or hue ($\phi$) of the incoming color difference signals. The values of the contents of each register location may be obtained empirically by a Cartesian-to-polar coordinate system translation by solving the equations:

$$R - Y = M \sin\phi \quad (1)$$

$$B - Y = M \cos\phi \quad (2)$$

for M and $\phi$, namely:

$$\phi = \arctan((R - Y)/(B - Y)); \text{ and} \quad (3)$$

$$M = \{[0.41(R - Y) + 0.48(B - Y)]^2 + [-0.27(R - Y) + 0.74(B - Y)]^2\}^{\frac{1}{2}}. \quad (4)$$

The contents of the appropriate register are then latched in respective latches in the third bank of latches 48. The digital value of the magnitude or saturation is latched in the saturation latch 54 and the digital value of the hue angle is latched in the hue latch 56.

Figure 8:
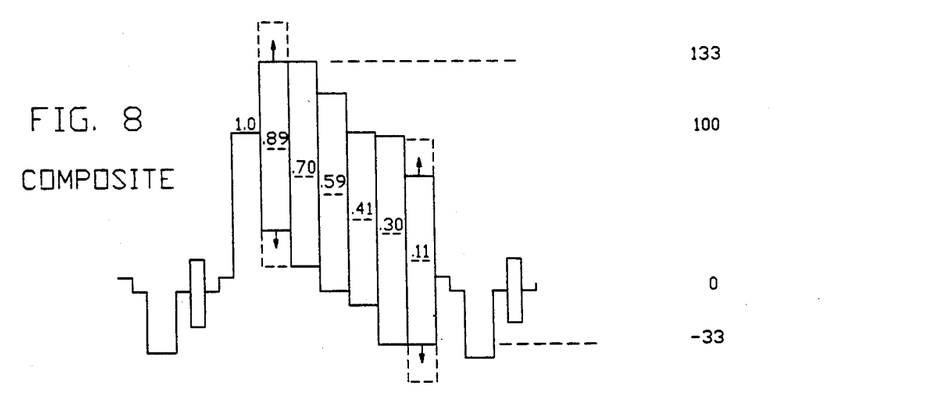
FIG. 8 is a schematic diagram of analog encoded color composite video signals.

The digital values of the parameters latched in the third bank of latches 48 are then available for use in the next cycle for clipping the saturation as necessary and producing a new modified saturation value M'. It should be noted that the color difference signals, originally expressed in digital form with bipolar characteristics, were converted to polar coordinates, i.e. an angle and a non-negative magnitude or saturation magnitude. However, the signals typically will ultimately be used to form a composite signal wherein the chrominance will still have bipolar characteristics (see FIG. 8), and this fact should be accounted for when analyzing or modifying the saturation magnitude M. The modified saturation value M' is obtained by taking the sum of the modified luminance Y' and the saturation M and comparing it with a positive reference value $+M_{ref}$ representing the maximum value that the encoded color video composite signal can obtain after the modified luminance and color difference signals are recombined into the composite signal, and by taking the difference of Y' and M, i.e. (Y'−M), and comparing it to −Mref, the minimum value that the encoded color video composite signal can obtain, according to the following equations:

$$\text{if } (Y' + M) > +Mref, \quad (5)$$
$$\text{then } M' = (+Mref - Y'); \text{ or} \quad (6)$$
$$\text{if } (Y' - M) < -Mref, \quad (7)$$
$$\text{then } M' = \text{abs val}(-Mref - Y'); \quad (8)$$
$$\text{else}$$
$$M' = M. \quad (9)$$

where +Mref is the positive reference value and −Mref is the negative reference value and "abs val" is the absolute value. (It should be noted that −Mref is not necessarily the negative of +Mref, the (−) being used only for nomenclature in this instance.) If the sum of Y' and M are greater than the positive reference value, or if the difference between Y' and M is less than the negative reference value, the modified saturation M' is then made equal to the digital value for saturation which, when substituted for M in equations (5) and (7) would make the equations false. In other words, the sum of the modified luminance Y' and the modified saturation M' would be equal to or less than +Mref and the difference of Y' and M' would be either greater than or equal to −Mref. This can be seen conceptually in FIG. 8, which shows an encoded video color composite signal. The signal is a composite of, among other things, the luminance and color difference signals. The luminance can be seen incorporated in the composite signal and is identical in shape to the luminance signal shown in FIG. 5. Because the composite signal incorporates the magnitude of the luminance signal and the magnitude of the saturation for a given hue, the sum of those two values for a given hue cannot exceed the pre-defined limits, in the present case 133 IRE and −33 IRE, in either the positive or negative direction. Because the luminance has already been modified, the only remaining variable which could cause the composite signal to exceed the pre-defined limits is the saturation of a given hue. If either of the sum or difference equations (5) or (7) are true, the saturation magnitude M is reduced in absolute value such that both equations are no longer true. Conversely, if both of the equations are originally false, then the resulting composite signal will fall within allowable limits, and the magnitude of the saturation is unchanged, i.e. the "modified" saturation M' is the same as the value of the unmodified saturation M. Equations (5) and (7) already account for the bipolar nature of the resulting composite signal by requiring that both equations be false. At the outer limits of luminance or saturation, one equation will predominate over the other.

Figure 4:
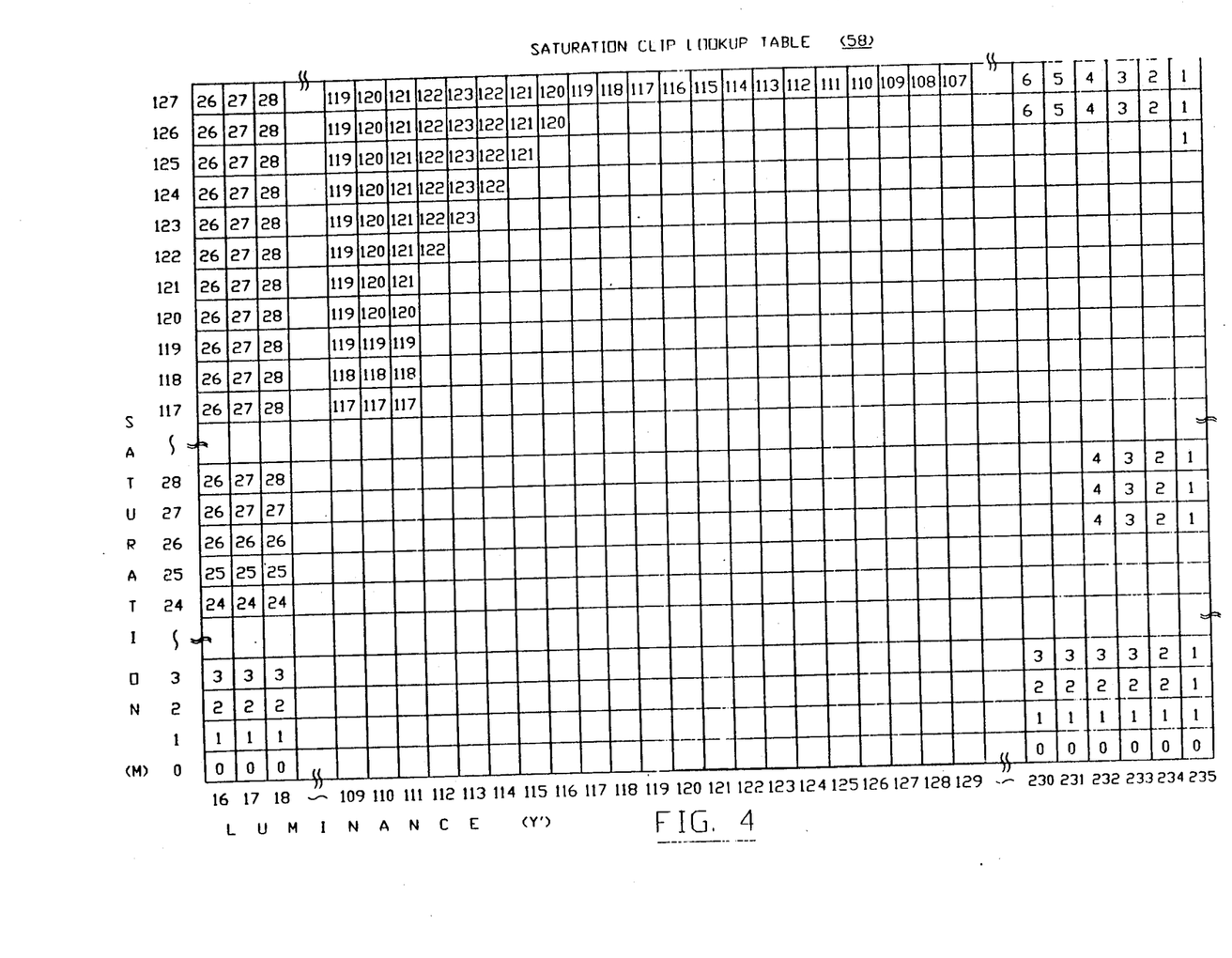
FIG. 4 is a schematic block diagram of a saturation clip lookup table for use in the digital processor of FIG. 1.

In the preferred embodiment, the unmodified saturation is checked in a saturation clipping circuit in the form of a saturation clip lookup table 58, which is an 8×64 K EPROM, one part of the array being accessed by the 8-bit representation of the modified luminance Y', the other being accessed by the 8-bit representation of the unmodified saturation M. FIG. 4 shows a schematic representation of the saturation clip lookup table, the address values for saturation being along the vertical axis and the address values for the modified luminance Y' being along the horizontal axis. The contents of each register location represent the modified saturation value or magnitude M' which, when added to or subtracted from the modified luminance, gives a value which does not exceed the pre-determined boundary levels and thus lies within a predetermined range of amplitudes. The EPROM contains digital representations of the appropriate modified saturation magnitude. It should be noted that the output of the table is still termed a modified saturation magnitude because it is the contents of the register which are output rather than the original input, even though the actual values of M and M' may be equal.

The contents of the saturation clip lookup table may be derived empirically and depend on the magnitudes of the digital representations of the saturation and luminance and of the pre-determined boundaries. Generally, the contents are found from equations (5)-(9) given above:

$$\text{if } (Y + M) > +Mref, \tag{5}$$
$$\text{then } M' = (+Mref - Y); \text{ or} \tag{6}$$
$$\text{if } (Y - M) < -Mref, \tag{7}$$
$$\text{then } M' = \text{abs val}(-Mref - Y); \tag{8}$$
$$\text{else}$$
$$M' = M. \tag{9}$$

By way of example, if the sum of modified luminance Y' and the saturation M is a maximum allowable value of 236, and the difference of Y' and M is a minimum allowable value of −10, the contents of the saturation clip lookup table may be such as shown in FIG. 4. (This example is used only for illustrative purposes and does not necessarily conform to an actual situation.) The contents of any given register location is accessed by using the digital value of the modified luminance Y' as one address value and the digital value of the unmodified saturation M as the other address value. Where the digital representation of the modified luminance Y' is 1 and the digital value of the unmodified saturation M is 0 (zero), the sum of those two values is less than 236 and the output modified saturation M is therefore 0 (zero), the same as the input value M. The same is true for other combinations of modified luminance and saturation until the sum of the two values is greater than 236. For example, where the modified luminance value Y' is 235 and the unmodified saturation M is 11, the output of the saturation clip lookup table is a digital value of 1 rather than the original saturation value of 11 so that the final composite signal does not exceed the pre-determined limits. Even if the unmodified saturation M went as high as 254, and the modified luminance value Y' for the particular hue was still 235, the modified saturation M' would still be 1. For a lower modified luminance Y' value, the modified saturation M' can be correspondingly higher. During this 6.75 MHz cycle, the modified luminance Y', the modified saturation M', the hue $\phi$ and the modified luminance(iso) $Y_{iso}'$ are latched in respective latches in a fourth bank of latches 60.

It should be understood that different +Mref and −Mref values can be used during the analysis of M simply by adding additional lookup tables containing correspondingly different values for M' calculated from equations (5), (6) and (7). Such additional values for M' may be stored in additional lookup tables stored in EPROMS. The user may then select between the desired values of +Mref and −Mref with an appropriate switch on a console. The tables may be modified as desired by storing new values in the appropriate registers.

During the next 6.75 MHz cycle, the modified luminance Y' value is latched in a fifth luminance latch 62, and the modified luminance(iso) $Y_{iso}'$ digital signal is latched in a fifth luminance(iso) latch 64. The digital hue signal $\phi$ and the modified saturation M' are used to obtain modified color difference signals R-Y' and B-Y' so that the modified luminance, luminance(iso) and color difference signals can be recombined in the TTL-to-ECL signal encoding circuit 18 for outputting as a reassembled 4:2:2 digital data stream.

The modified saturation and the hue are converted to modified color difference signals by a "saturation and hue" - to - "R-Y & B-Y" lookup table 66. The R-Y & B-Y lookup table is analogous to the saturation and hue lookup table 54 but operates in the reverse fashion to produce color difference signals using the modified saturation and hue as input digital parameters. Therefore, the equations:

$$R - Y = M' \sin\phi \tag{10}$$

$$B - Y = M' \cos\phi \tag{11}$$

may be solved to find the respective color difference signals. The contents of the registers in the R-Y & B-Y lookup table are derived empirically. Each register location of the lookup table is 16 bits wide, 8 bits for the modified R-Y color difference signal R-Y' and 8 bits for the modified color difference signal B-Y'.

The signal encoding circuit 18 produces digital color signals representing the luminance signal Y' and the modified color difference signals R-Y' and B-Y'. These digital color signals are provided in the form of serial data in the "D1" format. They are applied to an ECL driver 68 along with the clock signal to produce at its output a data stream and a clock signal.

The third bank of latches is controlled by a third timing circuit 70 from the timing generator 16. The third timing circuit 70 provides a 1-bit signal which is applied simultaneously to the latches in the third bank of latches 48. The timing generator also produces a 1-bit signal on a fourth timing circuit 72 to control the fourth bank of latches 60 and a 1-bit signal on a fifth timing circuit 74 to control the fifth bank of latches 76. The synchronization detector and timing generator 16 also produces timing reference signals, blanking, clock and synchronization signals to the signal encoding circuit 18. Timing reference signals and other signals are discussed in the SMPTE Recommended Practice, RP 125-198 on the subject of Bit-Parallel Digital Interface For Component Video Signals.

With the present invention, the D1 digital video signals containing luminance and the color difference signals, among other things, can be used to produce encoded color composite video signal falling only within the predetermined boundaries. The digital signals can be processed as before, but any subsequent color correction such as correction of hue or saturation, could require further retesting and modification of the saturation or luminance according to the present invention.

Considering FIGS. 5-8, color digital video signals including luminance, R-Y and B-Y color difference signals are derived from an appropriate circuit such as a color correction circuit. If, for example, a colorist modifies a scene such that the saturation of the yellow signal in the R-Y color difference signal is increased so that the digital representation approaches 236, the resulting composite video signal may include color signals representing yellow which exceed the maximum allowable limit of 133 IRE. This may not conform to the requirements of studios, networks and the like.

In order to check for such excursions in the encoded composite video signal, the processor of the present invention takes the incoming D1 digital signal and parses it into the digital representations of luminance and the color difference signals, after which the color difference signals are translated to polar coordinates to produce a hue angle and a saturation magnitude for each hue. The luminance value is then checked in the luminance clip lookup table 44 (FIG. 1) and an appropriate "modified" luminance is latched in the luminance latch 46. The modified luminance Y' and the saturation M from the saturation and hue lookup table are then analyzed according to equations (5)-(9) to determine whether or not the combined saturation and luminance corresponding to the particular hue would produce an excursion in a composite signal using the incoming digital signal. If so, a digital representation of a modified saturation signal M' is produced which is then combined with the particular hue angle to produce a modified set of color difference signals R-Y' and B-Y'. If the equations (5) and (7) are initially false, the "modified" saturation value M' is equivalent to the incoming digital representation of the saturation for the particular hue angle. In the example given where the color yellow is changed resulting in a composite signal which is outside the pre-determined boundaries, the saturation for the particular hue is decreased an amount necessary to bring the composite signal within the pre-determined boundaries. The luminance Y was previously modified to produce a digital modified luminance Y'. The modified saturation M' and the respective hue angle are then used in the R-Y & B-Y lookup table 66 to produce modified color difference signals R-Y' and B-Y'. These are then recombined with the modified luminance Y' and the modified luminance(iso) $Y_{iso}'$ in the signal encoding circuit 18 to produce a digital color signal which can be encoded into a composite signal without any improper excursions.

Figure 7:
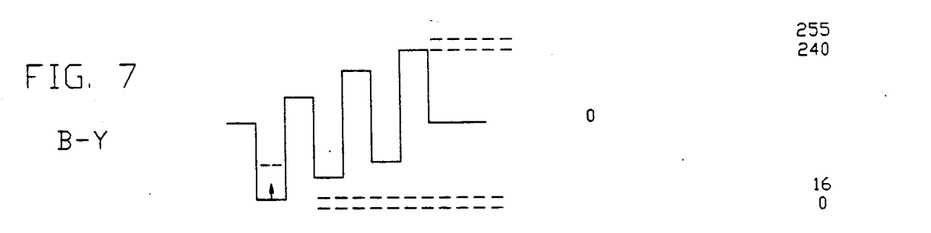
FIG. 7 is schematic diagram representing analog blue color difference signals (B-Y).

As another example of the possibility for an excursion, a colorist may introduce a color correction which decreases the saturation of a color in the blue hue in the B-Y color difference signal as shown in FIG. 7. The reduction in the saturation may be such as to cause the encoded color video composite signal shown in FIG. 8 to produce an excursion in a color signal corresponding to the blue hue below the limit of −33 IRE. The color corrected D1 digital signals are then applied to the digital processor as described above to produce a modified luminance signal Y' and modified color difference signals R-Y' and B-Y' so that any resulting encoded composite color video signal will not have any excursions corresponding to a blue color signal.

Means may be provided in the digital processor for notifying the colorist that the saturation and/or luminance has been modified by the digital processor. The resulting picture can also be displayed so that the colorist if desired, can readjust the original color correction to produce the desired effect while still producing color video signals which stay within pre-determined limits.

While the luminance clip lookup table has been discussed by way of example as having a maximum digital value of 236, the maximum digital value can be varied by providing a number of different selectable values. Depending on the particular values selected for a minimum and a maximum, those value's would then be stored in the luminance clip lookup table as appropriate. The same holds true for the values in the other lookup tables.

Although the present invention has been described in details with reference only to the presently preferred embodiments, it will be appreciated by those of ordinary skill in the art that various modifications can be made without departing from the invention.

I claim:
1. A processor for color video signals comprising:
means for receiving video color indicating signals at an input;
means for deriving coupled to receive the video color indicating signals from the receiving means, the deriving means deriving a luminance signal and a color magnitude signal from the video color indicating signals;
means for modifying at least one of the luminance and color magnitude signals whenever a composite video signal derived from the luminance signal and the color magnitude signal has a magnitude which exceeds a predetermined value; and
means for producing at an output color indicating signals derived from the luminance and color magnitude signals from the modifying means.

2. A color video signal processor according to claim 1 wherein the receiving means comprises means for receiving digital color indicating video signals.

3. A color video signal processor according to claim 2 wherein the means for deriving a color magnitude comprises means for deriving a saturation magnitude from color difference signals and wherein the modifying means modifies at least one of the luminance signal and the saturation magnitude whenever a composite video signal derived from the luminance signal and the saturation magnitude signal has a magnitude which exceeds a predetermined value.

4. A color video signal processor according to claim 2 wherein the modifying means includes means for modifying the luminance signal to a predetermined magnitude when the luminance signal is greater than the predetermined magnitude.

5. A color video signal processor according to claim 4 wherein the modifying means comprises means for modifying the color magnitude when the sum of the luminance signal and the color magnitude exceed a predetermined value.

6. A color video signal processor according to claim 5 wherein the modifying means further includes means for modifying the luminance signal before the color magnitude is modified.

7. A color video signal processor according to claim 2 wherein the deriving means includes means for changing color difference signals to a saturation signal.

8. A color video signal processor according to claim 7 wherein the changing means comprises a color difference signal to saturation and hue lookup table.

9. A color video signal processor according to claim 7 wherein the modifying means comprises a saturation clip lookup table.

10. A processor for color video signals comprising:
    means for receiving at an input signals representing digital video color signals including color difference and luminance signals;
    means responsive to the received video color difference signals for converting the received video color difference signals to hue signals represented by a hue angle and a saturation magnitude;
    means responsive to the saturation magnitude and to the luminance signals for generating a clipped saturation magnitude signal that is clipped to a range that assures both a sum of and a difference between a luminance value represented by the luminance signal and the saturation magnitude fall within a predetermined range of values; and
    means for producing at an output color signals representing the luminance signal whose magnitude was summed with the saturation magnitude and modified color difference signals produced from the modified saturation magnitude.

11. A method of processing color video signals comprising the steps of:
    receiving video color indicating signals at an input;
    deriving a luminance signal and a color magnitude signal from the received video color indicating signals;
    modifying at last one of the luminance and color magnitude signals whenever a composite video signal derived from the luminance signal and the color magnitude signal has a magnitude which exceeds a predetermined value; and
    producing at an output video color indicating signals derived from the luminance and color magnitude signals.

12. A processor for processing color video signals comprising:
    means for accepting color video signals at an input;
    means coupled to the accepting means for predicting from the received color video signals modulated chrominance amplitudes for composite video signals derivable from the received color video signals and for limiting the received color video signals independent of hue so that the amplitudes of any modulated chrominance signals derived therefrom do not extend beyond predetermined boundaries.

13. A processor for processing color video signals comprising:
    a luminance clipping circuit receiving a luminance signal and generating in response thereto a clipped luminance signal having a selected maximum magnitude; and
    a saturation clipping circuit coupled to receive a color saturation signal and the clipped luminance signal and generate in response thereto a clipped color saturation signal such that both a sum of the clipped luminance signal and the clipped saturation signal and a difference between the clipped luminance signal and the clipped saturation signal lie within a predetermined range of magnitudes.

14. A processor for processing color video signals according to claim 13 further comprising a video signal conversion circuit coupled to receive an input color video signal and convert the color video signal to a luminance, hue angle and saturation format.

15. A processor for processing color video signals according to claim 13 further comprising a video signal conversion circuit coupled to receive the clipped luminance signal, the clipped saturation signal and a hue angle signal and provide conversion thereof to a luminance and color difference format.

16. A processor for processing color video signals according to claim 14 further comprising a second video signal conversion circuit coupled to receive the clipped luminance signal, the clipped saturation signal and a hue angle signal and provide a conversion thereof to an output video signal having the same format as the received color video signal.

17. A processor for processing color video signals according to claim 16 wherein the luminance clipping circuit and the saturation clipping circuit have clipping levels selected to assure that the output video signal does not exceed standard signal specifications.

18. A processor for processing color video signals according to claim 16 wherein the received color video signal has a luminance and color difference signal format.

19. A processor for processing color video signals according to claim 13 wherein the luminance clipping circuit includes a lookup table receiving the luminance signal as an address input and generating the clipped luminance signal from data stored at a location addressed by the luminance signal.

20. A processor for processing color video signals according to claim 13 wherein the saturation clipping circuit includes a lookup table receiving the color saturation signal as an address input and generating the clipped saturation signal as the contents of a storage location addressed by the color saturation signal address input.

21. A color video signal processor comprising:
    a first set of registers coupled to receive and store a representation of the color video signal in a signal format including a luminance signal and two color difference signals;
    a luminance clipping circuit coupled to receive the luminance signal and generate in response thereto a clipped luminance signal that does not exceed a predetermined maximum magnitude;

a color difference to hue and saturation conversion circuit coupled to receive the two color difference signals and generate in response thereto a hue signal and a saturation signal that are representative of the received color difference signals;

a second set of registers coupled to receive and store the clipped luminance signal, the saturation signal and the hue signal;

a saturation clipping circuit coupled to receive the clipped luminance signal and the saturation signal and generate a clipped saturation signal that is clipped to assure that the sum and the difference of the received clipped luminance signal and the saturation signal both lie within a predetermined magnitude range; and a third set of registers coupled to receive and store the clipped luminance signal from the second set of registers, the clipped saturation signal, and the hue signal from the second set of registers.

22. A color video signal processor according to claim 21 further comprising a hue saturation to color difference conversion circuit coupled to receive from the third set of registers the clipped saturation signal and the hue signal and generate two color difference signals in response thereto.

23. A color video signal processor according to claim 22 further comprising a fourth set of registers receiving and storing the clipped luminance signal from the third set of registers, and the two color difference signals form the hue saturation to color difference conversion circuit.

24. A method of assuring that a composite video signal does not exceed standard signal component limitations comprising the steps of:

converting a received video signal to a luminance and color difference signal representation;

clipping the converted luminance signal to a standard signal level maximum amplitude;

converting the color difference signals to a saturation and hue signal representation;

clipping the saturation signal to a selected amplitude range that assures that the sum and difference of the clipped luminance and saturation signals lies within a selected amplitude range;

converting the clipped saturation signal and the hue signal to a set of output color difference signals; and converting the set of output color difference signals and the clipped luminance signal to a video signal that does not exceed standard signal component limitations.

* * * * *